US009283587B2

(12) United States Patent
Schneider et al.

(10) Patent No.: US 9,283,587 B2
(45) Date of Patent: Mar. 15, 2016

(54) SYSTEM FOR THE TREATMENT OF OBJECTS, IN PARTICULAR THE CATAPHORETIC DIP PAINTING OF OBJECTS, IN PARTICULAR VEHICLE BODIES

(75) Inventors: Gerd Schneider, Gaertringen (DE); Alexander Schurba, Boeblingen (DE)

(73) Assignee: EISENMANN AG, Boeblingen (DE)

( * ) Notice: Subject to any disclaimer, the term of this patent is extended or adjusted under 35 U.S.C. 154(b) by 297 days.

(21) Appl. No.: 14/116,795

(22) PCT Filed: Apr. 27, 2012

(86) PCT No.: PCT/EP2012/001810
§ 371 (c)(1),
(2), (4) Date: Nov. 11, 2013

(87) PCT Pub. No.: WO2012/152385
PCT Pub. Date: Nov. 15, 2012

(65) Prior Publication Data
US 2014/0083355 A1  Mar. 27, 2014

(30) Foreign Application Priority Data

May 12, 2011  (DE) .......................... 10 2011 101 278

(51) Int. Cl.
*B05C 3/02* (2006.01)
*B65G 49/04* (2006.01)

(52) U.S. Cl.
CPC .............. *B05C 3/02* (2013.01); *B65G 49/0459* (2013.01)

(58) Field of Classification Search
None
See application file for complete search history.

(56) References Cited

U.S. PATENT DOCUMENTS

| | | | |
|---|---|---|---|
| 2003/0097982 A1 | 5/2003 | Ehrenleitner et al. | |
| 2005/0269205 A1 | 12/2005 | Ehrenleitner | |
| 2008/0247847 A1 | 10/2008 | Muller et al. | |
| 2010/0319617 A1 | 12/2010 | Robbin | |
| 2012/0216746 A1* | 8/2012 | Schneider ......... | B65G 49/0459 118/500 |

FOREIGN PATENT DOCUMENTS

| | | |
|---|---|---|
| DE | 100 63 448 A1 | 7/2002 |
| DE | 102 10 941 A1 | 10/2003 |

(Continued)

OTHER PUBLICATIONS

English Translation of Written Opinion for PCT/EP2012/001810 having identical claims to U.S. Appl. No. 14/116,795.*

*Primary Examiner* — Charles Capozzi
(74) *Attorney, Agent, or Firm* — Factor Intellectual Property Law Group, Ltd.

(57) ABSTRACT

A system for treating objects having at least one dipping tank, the objects being introducible into and removable out of said dipping tank by a transport carriage which moves on two parallel rails in an operating position and has a shaft that extends from one rail to the other rail in a transverse manner with respect to the two rails in the operating position. At least one pivoting arm is connected to the shaft, said pivoting arm having a supporting frame for the object. The shaft is pivotally hinged to the body of the transport carriage in an end region that adjoins one of the two rails such that said shaft can rotate together with the pivoting arm and the supporting frame into a space-saving position, in which said shaft runs approximately parallel with respect to one of the two rails. In this manner, the transport carriage can be converted into a single-track vehicle when returning from the unloading position of the objects into the loading position.

4 Claims, 6 Drawing Sheets

(56) References Cited

FOREIGN PATENT DOCUMENTS

| DE | 10 2004 024 614 A1 | | 12/2005 | |
| DE | 10 2008 010 400 A1 | | 10/2009 | |
| DE | 102009051316 | * | 5/2011 | ............... B05C 3/10 |
| DE | 10 2010 001 366 A1 | | 8/2011 | |
| WO | 03/070545 A1 | | 8/2003 | |

\* cited by examiner

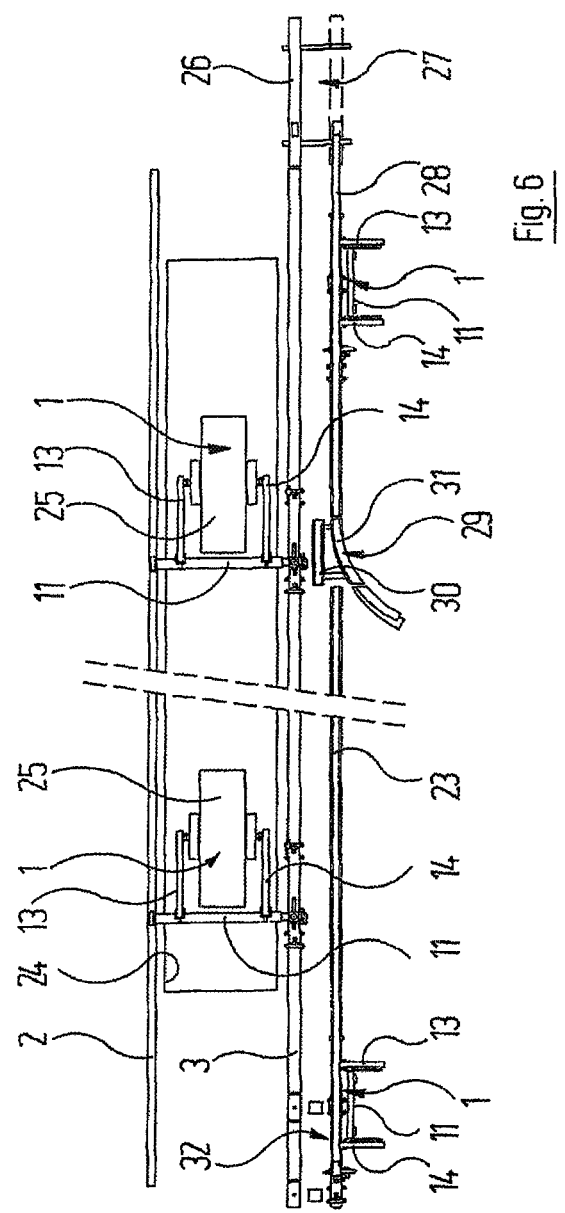

SYSTEM FOR THE TREATMENT OF OBJECTS, IN PARTICULAR THE CATAPHORETIC DIP PAINTING OF OBJECTS, IN PARTICULAR VEHICLE BODIES

RELATED APPLICATIONS

This application claims the filing benefit of International Patent Application No. PCT/EP2012/001810, filed Apr. 27, 2012, which claims the filing benefit of German Patent Application No. 10 2011 101 278.1, filed May 12, 2011, the contents of both of which are incorporated herein by reference.

FIELD OF THE INVENTION

The invention relates to a system for the treatment of objects, in particular for the cataphoretic dip painting of objects, in particular vehicle bodies, having a) at least one dipping tank in which the objects undergo a treatment;
b) two parallel rails;
c) at least one transport carriage which guides the objects through the system and in so doing puts them into and takes them out of the dipping tank, and which for its part includes:
  ca) running gear that can travel on the two rails;
  cb) a shaft which is connected to the running gear and, in an operating position, extends transversely in relation to the two rails, from the one rail to the other;
  cc) at least one pivotal arm which is connected to the shaft such that it cannot rotate in relation thereto;
  cd) a mounting frame, which is connected to the pivotal arm, for at least one object.

BACKGROUND OF THE INVENTION

A system of this kind is known from DE 102 10 941 A1. Here, the running gear of the transport carriage is constructed to be substantially symmetrical to a centre plane which extends centrally between the two rails on which the running gear travels. The angle formed between the shaft and the two rails is 90° and cannot be varied. This is a two-track vehicle which is suitable in particular for relatively heavy loads. However, the following disadvantage is associated with it: once any transport carriage which has guided an object through the system has been unloaded, it has to be returned again to a starting position, in which it is loaded with a new object. This returning of the transport carriages cannot generally be performed on the same rails as the "outward" movement; rather, in addition to the "outward" rails, two further rails have to be provided on which the "return" path is then performed. These two rails necessarily occupy a relatively large space in the room where the system is located. However, there is frequently not much space available, and in all cases it comes at a cost.

DE 10 2008 010 400 A1 discloses a system for dip treating objects in which the transport system is constructed in the manner of an overhead track. This is a single-rail system. The individual transport carriages moved on the single rail are provided with a telescope-like securing means at the lower end whereof a rotary shaft is provided. This projects freely, pointing away from the rail on which the transport carriages can travel, and bears a mounting frame for an object that is to be treated. The securing means is able to rotate about a vertical axis with the shaft and the mounting frame, with the result that the transport carriages occupy less space during the return from the unloading station to the loading station. In all sections of the system, however, the transport carriages are single-track and so less suitable for receiving large loads.

An object of the present invention is to further develop a system of the type mentioned at the outset such that there is less space requirement, in particular on the return path from the unloading station to the loading station, while retaining the bearing capacity of the individual transport carriages.

SUMMARY OF THE INVENTION

According to the invention, this object may be achieved in that
d) the shaft is articulated in a manner pivotal on the running gear in an end region adjacent to one of the two rails such that it can be rotated, together with the pivotal arm and the mounting frame, into a space-saving position in which it extends approximately parallel to one of the two rails.

According to the invention, the transport carriages are thus constructed such that, in the regions in which they are loaded with objects and a high bearing capacity is demanded, they take the form of a two-track vehicle which can be supported on two rails, as a result of which one-sided flexural moments cannot act on the shaft. Where the load is removed from the transport carriage, however, that is to say in particular on the return path from the unloading station to the loading station, a transport carriage according to the invention can be converted to a single-track vehicle which needs only a single floor rail, as a result of which the space requirement is considerably reduced. A further advantage of the single-track vehicle can be seen in the fact that it is capable of going around curves, something which is only true to a very limited extent in the case of a two-track transport carriage.

Advantageously, at least one support wheel is mounted at the end of the shaft remote from its point of articulation, and in the operating position of the shaft this support wheel can roll on the appropriate rail. Generally, this support wheel will not be driven but serves substantially only to introduce the forces of weight on the corresponding side of the shaft into the rail there.

The running gear may have a substantially upright column, which may be rotated about a vertical axis and to which the shaft is connected in an end region.

Here, it is particularly advantageous if, at the upper end of the column, there is provided a guide roller which may be rotated about an approximately vertical axis and, along those portions of the system in which the transport carriage may be moved in the space-saving position, there is provided a guide rail on which the guide roller can move. In this way, tilting moments in the single-track mode of the transport carriage are managed.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention will be explained in more detail below with reference to the drawing, in which:

FIG. 6 shows a plan view of a detail of a system for dip painting vehicle bodies.

DETAILED DESCRIPTION OF THE PRESENT INVENTION

Figure 1:
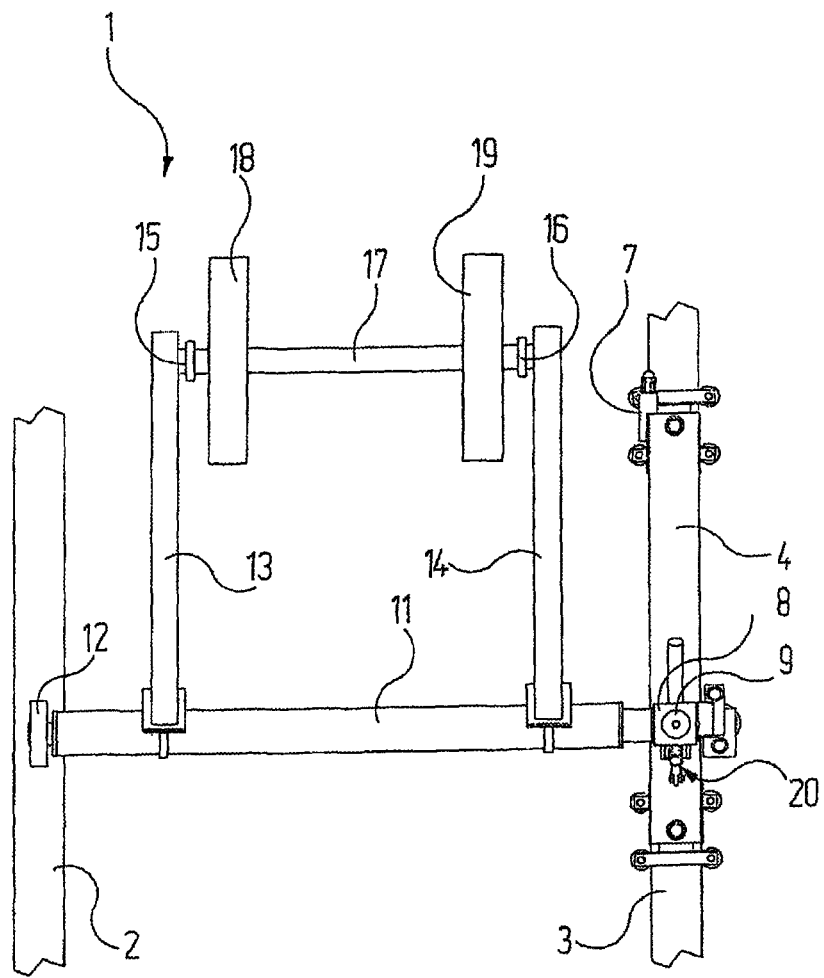
FIG. 1 shows a plan view of a transport carriage in the operating position.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

First of all, reference will be made to FIGS. 1 to 3. These show a transport carriage which is designated overall by the reference numeral 1 and whereof the operating environment, mode of operation and control are known from the printed specifications mentioned at the outset, in particular DE 100 63 448 A, unless indicated otherwise below. These printed specifications are incorporated by reference.

The transport carriage 1 may move on two parallel rails 2, 3. It includes a longitudinal bearer 4 (cf. in particular FIG. 3) on which two running wheels 5, 6 are mounted such that they can rotate. The running wheels 5, 6 run on the rail 3 which is seen on the right in FIGS. 1 and 2. One of the running wheels, namely that bearing reference numeral 6, is driven by a motor 7. Secured to the longitudinal bearer 4 is a vertical column 8, at the upper end whereof is mounted a guide roller 9 that may rotate about a vertical axis of rotation. Moreover, the entire column 8 is itself rotatable about a vertical axis by means of a drive motor 10.

Secured to the column 8 is a shaft 11 which can be pivoted, together with the column 8, about the said vertical axis. Arranged such that it may freewheel at the free end of the shaft 11 is a support wheel 12 which, in the position of the shaft 11 that is illustrated in FIGS. 1 and 2, can roll on the rail 2.

Further secured to the shaft 11 are two parallel pivotal arms 13, 14. A respective linking plate 15, 16 is articulated to each of the ends of the pivotal arms 13, 14 remote from the shaft 11, and these linking plates 15, 16 are connected to one another at their lower end by a transverse strut 17. The transverse strut 17, for its part, holds two parallel plate-like bearers 18, 19 such that they may not rotate in relation thereto, and an object to be treated, in particular a vehicle body to be painted, may be secured on these bearers 18, 19. The transverse strut 17 and the bearers 18, 19 may thus be regarded as a mounting frame for the object.

Figure 3:
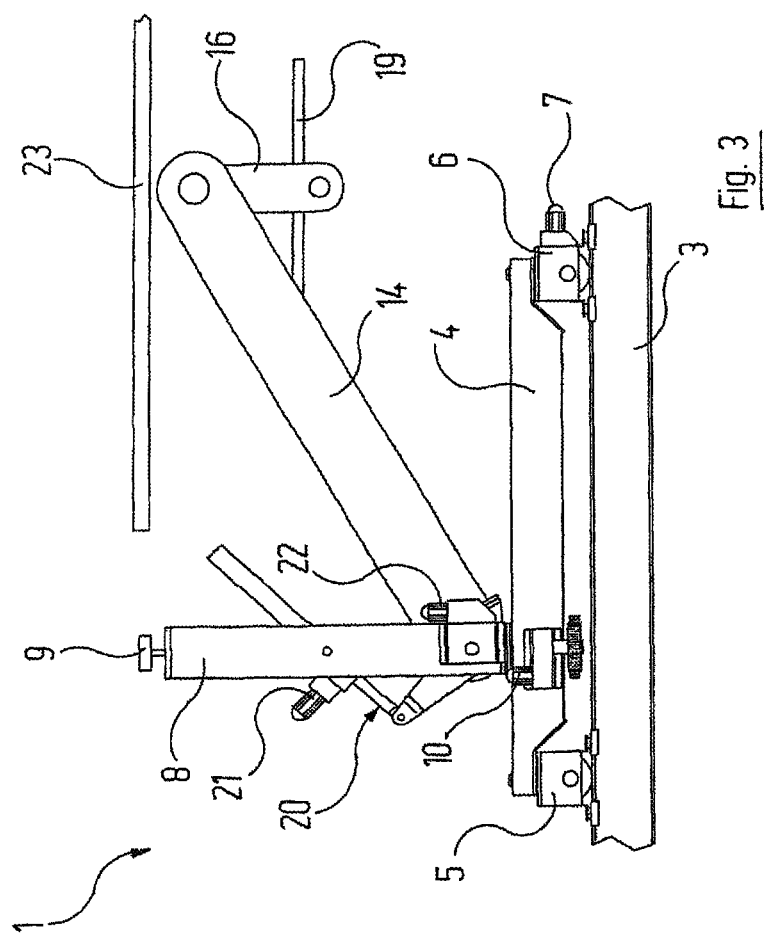
FIG. 3 shows a side view of the transport carriage from FIGS. 1 and 2.

The shaft 11, with the pivotal arms 13, 14 secured thereto and together with the linking plates 15 and 16 and the transverse strut 17 with the bearers 18, 19, can pivot about the axis of the shaft 11 with the aid of a pivot mechanism 20, which is illustrated in particular in FIG. 3 and need not be described in detail. It is sufficient to say that with the aid of the a motor 21, which is part of the pivot mechanism 20, the free ends of the pivotal arms 13, 14 and hence the transverse strut 17 with the bearers 18 and 19 and the object secured thereto may be raised and lowered.

With the aid of a further motor 22 and a drive, which is not illustrated in detail and which passes partly through the shaft 11 and partly through the pivotal arm 14, the linking plates 15, 16 may moreover be rotated about their respective articulation point at the upper end of the pivotal arm 13, 14. In this way, the object secured to the bearers 18, 19 is able to make all the movements that are already described in the above-mentioned DE 102 10 941 A.

Whereas, in the case of the bearing carriage described in that printed specification, advance through the system and return can be performed in the same way, that is in particular on two parallel rails, the transport carriage 1 described in the present document can when required be moved in a space-saving position on only a single rail, namely the rail 3. A requirement of this kind may exist in particular when, once an object to be treated has passed through the various treatment stations, it is removed from the bearing carriage 1 and the bearing carriage 1 is to be returned to its starting position again, where it is then loaded with a new object to be treated.

Figure 2:
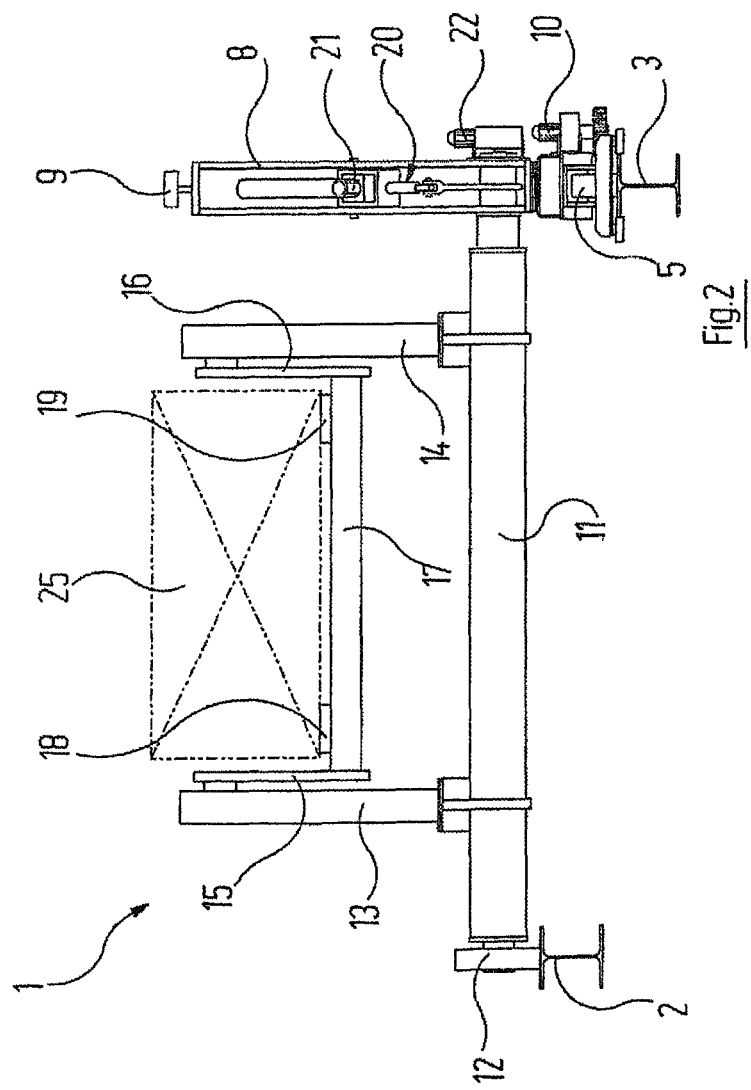
FIG. 2 shows a view of the transport carriage from FIG. 1, as seen in the direction of travel.
Figure 4:
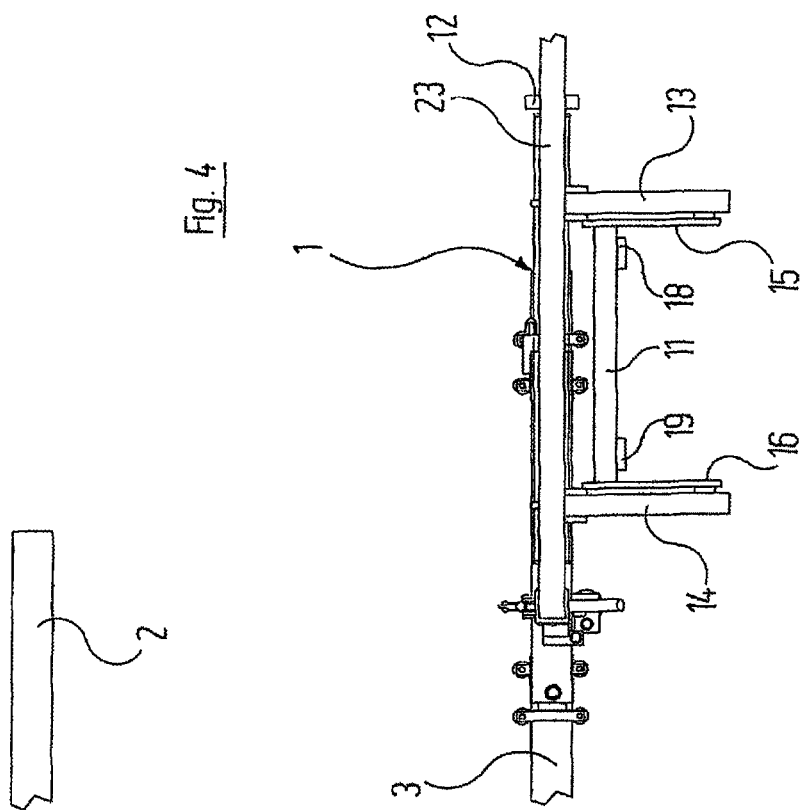
FIG. 4 shows a plan view of the transport carriage from FIGS. 1 to 3, in a space-saving position.
Figure 5:
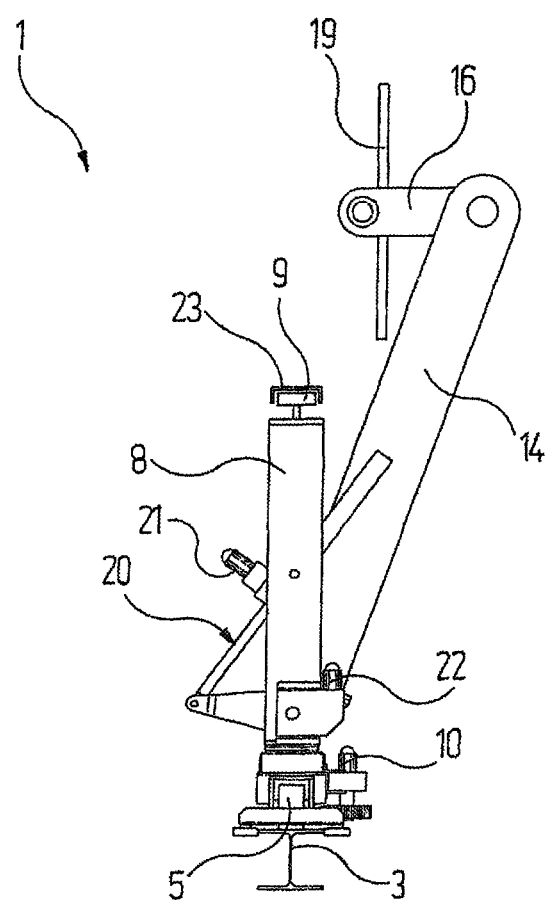
FIG. 5 shows a side view of the transport carriage from FIG. 4, in the space-saving position.

To move from the operating position in FIGS. 1 to 3 into the space-saving position illustrated in FIGS. 4 and 5, first of all the pivotal arms 13, 14 are pivoted as far up as possible; the linking plates 15, 16 are put into a rotary position in which the bearers 18, 19 are substantially upright. In this way, the bearing carriage 1 has as little reach in the direction perpendicular to the shaft 11 as possible, as can be seen from FIG. 5.

FIG. 5 shows a condition in which a further step has already been taken in adopting the space-saving position. This step consists in rotation of the shaft 11, together with the pivotal arms 13, 14, the linking plates 15, 16, the transverse strut 17 and the bearers 18, 19, by 90° about the vertical axis of the column 8, with the result that the shaft 11 comes to lie above the rail 3 and parallel thereto.

To prevent the transport carriage 1 from tilting when it is in this space-saving position, a guide rail 23 in the form of a downwardly open U-shaped profile (cf. FIG. 5) is provided above the rail 3 in the regions in which the transport carriage 1 is to be moved in the space-saving position. This guide rail 23 is suitably secured, for example to a steel structure. It receives the guide roller 9 at the upper end of the column 8 in the regions of the system in question—those in which the transport carriage 1 is moved in the space-saving position.

FIG. 6 shows, in plan view, how a system portion on which a transport carriage 1 according to FIGS. 1 to 5 is used may look. Once again, the two parallel rails 2, 3 on which (in the exemplary embodiment illustrated) two transport carriages 1 are located in the normal operating position are visible. The rails 2, 3 extend either side of one or more dipping tanks 24 in which one or more treatments of vehicle bodies 25 borne by the transport carriages 1 are performed. One of these treatments is generally a cataphoretic dip painting.

Let us assume that the direction of transport of the transport carriages 1 runs from left to right in FIG. 6. Thus, the transport carriages 1 at the left-hand end (in FIG. 6) of the rail 2, 3 are loaded with the vehicle bodies 25. They then move to the right in FIG. 6 as far as the start of the first dipping tank 24, where they dip the vehicle body 25 in the treatment medium in the first dipping tank 24, by pivoting the pivotal arms 13, 14 and where appropriate by pivoting the linking plates 15, 16, in accordance with a predetermined kinematic sequence. As the transport carriages 1 move on, the vehicle bodies 25 are then guided in known manner through the dipping tank 24 and where appropriate further dipping tanks. At the right-hand end (in FIG. 6) of the rails 2, 3, the dipping treatments are complete and the treated vehicle bodies 25 are removed from the transport carriage 1.

The transport carriages 1, which are now empty, have to be taken back again to the starting point, that is to say the left-hand end of the rails 2, 3 in FIG. 6. For this purpose, they are first moved out of the operating position in FIGS. 1 to 3 and into the space-saving position in FIGS. 4 and 5, in the manner described above. They then move on the rail 26 of a displacement carriage, indicated schematically and designated overall by the reference numeral 27, which is known per se and does not therefore require further description. The rail 26 of the displacement carriage 27 is now brought into alignment with a return rail 28 which extends over substantially the entire length of the rails 2, 3 and parallel thereto.

Above the return rail 28 there runs a guide rail 23 which, as already explained above, cooperates with the guide rollers 9 of the individual transport carriages 1. The transport carriages 1 are now moved along the return line 28 from right to left in FIG. 6, reversing the direction of travel. In so doing, they reach the region of a shifting points unit 29. This is also of known construction. It includes a straight line section 30 and a curved line section 31. When the curved line section 31 is brought into alignment with the return rail 28, the transport carriage 1, which as seen in FIG. 6 is moving to the left, can be transferred out of the system at this point and for example sent to repair. Conversely, a new transport carriage 1 may be introduced into the system by way of the rail section 31.

If the straight rail section 30 of the shifting points unit 29 is in alignment with the return rail 28, the transport carriages 1 may move further to the left, as seen in FIG. 6, until they reach the end region of the rails 2, 3 and 28. Located there is a four-way switch point 32, whereof the structure does not need to be explained in detail either, since it is known to those skilled in the art. With the aid of the four-way switch point 32, the arriving transport carriages 1 are transferred back onto the rail 3. The column 8, together with the shaft 11, the pivotal arms 13, 14, the linking plates 15, 16, the transverse strut 17 and the bearers 18, 19, is then rotated through 90° again, with the result that the shaft 11 is perpendicular to the rails 2, 3 and the support wheel 12 comes to lie on the rail 2 again. Then, the transport carriage 1 can be loaded with a vehicle body 25 again and guided through the dipping tank or tanks 24 in the manner already described above.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A system for the treatment of objects comprising:
 a) at least one dipping tank in which objects undergo a treatment;
 b) two parallel rails;
 c) at least one transport carriage which guides the objects through the system and in so doing puts the objects into the at least one dipping tank and takes the objects out of the at least one dipping tank, and which includes:
  ca) a running gear that travels on the two rails;
  cb) a shaft which is connected to the running gear and, in an operating position, extends transversely in relation to the two rails, from the one rail to the other rail;
  cc) at least one pivotal arm which is connected to the shaft such that it cannot rotate in relation thereto;
  cd) a mounting frame, which is connected to the at least one pivotal arm, for at least one object, and wherein,
 d) the shaft is articulated in a manner pivotal on the running gear in an end region adjacent to one of the two rails such that the shaft is rotatable, together with the at least one pivotal arm and the mounting frame, into a space-saving position in which the shaft extends substantially parallel to one of the two rails.

2. The system according to claim 1, wherein at least one support wheel is mounted at an end of the shaft remote from the articulated end region of the shaft, and in the operating position of the shaft the at least one support wheel can roll on the corresponding rail.

3. The system according to claim 1, wherein the running gear has a substantially upright column, which is capable of being rotated about a vertical axis and to which the shaft is connected in the end region.

4. The system according to claim 3, wherein, at an upper end of the column, there is provided a guide roller which may be rotated about a substantially vertical axis and in that, along portions of the system in which the at least one transport carriage is capable of being moved in the space-saving position, there is provided a guide rail on which the guide roller moves.

* * * * *